US010862853B2

(12) United States Patent
Zhang et al.

(10) Patent No.: US 10,862,853 B2
(45) Date of Patent: Dec. 8, 2020

(54) METHOD AND APPARATUS FOR AUTOMATIC GEOAWARE ACCESS POINT PROVISIONING

(71) Applicant: Time Warner Cable Enterprises LLC, St. Louis, MO (US)

(72) Inventors: Qiang Zhang, Mclean, VA (US); Arun Manroa, Herndon, VA (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 0 days.

(21) Appl. No.: 16/280,473

(22) Filed: Feb. 20, 2019

(65) Prior Publication Data

US 2019/0182205 A1 Jun. 13, 2019

Related U.S. Application Data

(63) Continuation of application No. 14/886,189, filed on Oct. 19, 2015, now Pat. No. 10,243,918.

(51) Int. Cl.
*H04L 29/12* (2006.01)
*H04W 24/02* (2009.01)
*H04W 88/08* (2009.01)
*H04W 88/12* (2009.01)
*H04W 84/12* (2009.01)

(52) U.S. Cl.
CPC ...... *H04L 61/1511* (2013.01); *H04L 61/1552* (2013.01); *H04L 61/2007* (2013.01); *H04W 24/02* (2013.01); *H04W 84/12* (2013.01); *H04W 88/08* (2013.01); *H04W 88/12* (2013.01)

(58) Field of Classification Search
None
See application file for complete search history.

(56) References Cited

U.S. PATENT DOCUMENTS

| 2011/0002302 | A1  | 1/2011  | Ding et al. |
| 2011/0096750 | A1* | 4/2011  | Velandy ............... H04W 48/17 370/331 |
| 2013/0114463 | A1* | 5/2013  | Li ........................ H04W 48/18 370/254 |
| 2014/0047104 | A1  | 2/2014  | Rodriguez |
| 2015/0188877 | A1* | 7/2015  | Yan ..................... H04L 61/1511 709/245 |
| 2015/0350912 | A1* | 12/2015 | Head ..................... H04W 12/08 726/4 |

(Continued)

*Primary Examiner* — Jutai Kao
(74) *Attorney, Agent, or Firm* — Armis IP Law, LLC (57) ABSTRACT

Systems and methods of discovering and registering with a WiFi controller by a wireless access point that can provide location awareness in the WiFi controller discovery and registration process. The systems and methods employ a DNS server that can receive a DNS query containing the FQDN of a WiFi controller from an access point, and compare the FQDN of the WiFi controller and the source IP address of the DNS query against a mapping table, which maps FQDNs of WiFi controllers and ranges of source IP addresses of DNS queries to groups of WiFi controllers. By comparing the FQDN of the WiFi controller and the source IP address against the mapping table, the DNS server can resolve the FQDN to IP addresses of a group of WiFi controllers, which can belong to a particular broadband service provider, and/or serve a target market of mobile subscribers located within a geographical area.

26 Claims, 6 Drawing Sheets

(56) References Cited

U.S. PATENT DOCUMENTS

2016/0050178 A1* 2/2016 Frydman ............. H04L 61/1552
　　　　　　　　　　　　　　　　　　　　　　709/219
2017/0064614 A1* 3/2017 Sedlacek ............. H04L 61/1511
2018/0091967 A1* 3/2018 Gupta .................. H04W 48/14

* cited by examiner

| | FQDN_A | FQDN_B | FQDN_C |
|---|---|---|---|
| Src_IP_addr_0 | Res_IP_addr_0a, WMS_IP_addr_0a | Res_IP_addr_0b, WMS_IP_addr_0b | Res_IP_addr_0c, WMS_IP_addr_0c |
| Src_IP_addr_1 | Res_IP_addr_1a, WMS_IP_addr_0a | Res_IP_addr_1b, WMS_IP_addr_0b | Res_IP_addr_1c, WMS_IP_addr_0c |
| Src_IP_addr_2 | Res_IP_addr_2a, WMS_IP_addr_0a | Res_IP_addr_2b, WMS_IP_addr_0b | Res_IP_addr_2c, WMS_IP_addr_1c |
| Src_IP_addr_3 | Res_IP_addr_3a, WMS_IP_addr_0a | Res_IP_addr_3b, WMS_IP_addr_0b | Res_IP_addr_3c, WMS_IP_addr_1c |
| Src_IP_addr_4 | Res_IP_addr_4a, WMS_IP_addr_0a | Res_IP_addr_4b, WMS_IP_addr_1b | Res_IP_addr_4c, WMS_IP_addr_2c |
| Src_IP_addr_5 | Res_IP_addr_5a, WMS_IP_addr_0a | Res_IP_addr_5b, WMS_IP_addr_1b | Res_IP_addr_5c, WMS_IP_addr_2c |
| Src_IP_addr_6 | Res_IP_addr_6a, WMS_IP_addr_0a | Res_IP_addr_6b, WMS_IP_addr_1b | Res_IP_addr_6c, WMS_IP_addr_3c |
| Src_IP_addr_7 | Res_IP_addr_7a, WMS_IP_addr_0a | Res_IP_addr_7b, WMS_IP_addr_1b | Res_IP_addr_7c, WMS_IP_addr_3c |

METHOD AND APPARATUS FOR AUTOMATIC GEOAWARE ACCESS POINT PROVISIONING

RELATED APPLICATION

This application is a continuation of earlier filed U.S. patent application Ser. No. 14/886,189 entitled "METHOD AND APPARATUS FOR AUTOMATIC GEOAWARE ACCESS POINT PROVISIONING," filed on Oct. 19, 2015, the entire teachings of which are incorporated herein by this reference.

TECHNICAL FIELD

The present application relates generally to systems and methods of discovering and registering with a Wireless Fidelity (WiFi) controller by a wireless access point, and more specifically to such systems and methods that can provide location awareness in the wireless access point's discovery of and registration with a WiFi controller.

BACKGROUND

In recent years, Wireless Fidelity (WiFi) networks have been increasingly deployed in urban areas, office buildings, and college campuses, as well as public venues such as airports, stadiums, and coffee shops. In response to such increased WiFi network deployment, broadband service providers have sought to provide their mobile subscribers with the capability of accessing WiFi networks in a manner that is easy, quick, and seamless. Such mobile subscribers can typically obtain access to a WiFi network using a WiFi-enabled device (e.g., a WiFi-enabled smartphone, tablet computer, or laptop computer) that is within a communication range of a wireless access point coupled to the WiFi network. Such a wireless access point can be configured as either a "standalone" wireless access point, or a so-called "lightweight" wireless access point that must discover and register with an external WiFi controller in order to operate. For example, each standalone wireless access point, as well as each lightweight wireless access point in combination with a WiFi controller, may be configured to support Hotspot 2.0, which is a technology based on the Institute of Electrical and Electronic Engineers (IEEE) 802.11u, 802.11i, and 802.1x standards and generally known as WiFi-certified Passpoint™.

In a typical scenario, a lightweight wireless access point can perform a process of discovering and registering with a WiFi controller over a network, as follows. Upon booting-up, the wireless access point can obtain an Internet protocol (IP) address by broadcasting a dynamic host configuration protocol (DHCP) discover message over the network for receipt by a DHCP server. Having received the DHCP discover message, the DHCP server can send, over the network to the wireless access point, a DHCP offer message that contains an IP address for the wireless access point, as well as an IP address for a domain name system (DNS) server on the network. Such a DHCP offer message can further contain vendor specific information in an option field (e.g., the option field corresponding to DHCP option 43), which can include the fully qualified domain name (FQDN) of a WiFi controller. Having received the DHCP offer message from the DHCP server, the wireless access point can attempt to resolve the FQDN of the WiFi controller by sending a DNS query message over the network to the IP address of the DNS server. In response to the DNS query message from the wireless access point, the DNS server can send, over the network to the IP address of the wireless access point, a DNS response message that contains a list of one or more IP addresses for one or more candidate WiFi controllers.

From among the list of IP addresses for candidate WiFi controllers, the lightweight wireless access point can select a suitable WiFi controller, and register with the selected WiFi controller by sending a join request message over the network to the IP address of the selected WiFi controller. Such a join request message can contain a certificate (e.g., an X.509 certificate) for the wireless access point. Upon receipt of the join request message, the selected WiFi controller can validate the wireless access point's certificate contained in the join request message. Once the wireless access point's certificate is validated, the WiFi controller can send a join response message over the network to the IP address of the wireless access point, in which the join response message can contain a certificate (e.g., an X.509 certificate) for the WiFi controller. Upon receipt of the join response message, the wireless access point can likewise validate the WiFi controller's certificate contained in the join response message, thereby completing the wireless access point's discovery and registration process with the selected WiFi controller. Using the selected WiFi controller, the wireless access point can then provide WiFi network access services to WiFi-enabled device(s) that come within its communication range within the WiFi network.

The typical scenario of discovering and registering with a WiFi controller by a wireless access point described herein has drawbacks, however, in that it is often required to register such a wireless access point with a WiFi controller that is a member of a specific group of WiFi controllers. For example, the members of such a group of WiFi controllers may belong to a particular broadband service provider, and/or may be configured to serve a target market of mobile subscribers located within a particular geographical area. However, conventional approaches to discovering and registering with WiFi controllers by wireless access points may be incapable of automatically providing location awareness in the WiFi controller discovery and registration process. In some cases, such conventional approaches may require a wireless access point to be initially registered with a centralized WiFi controller, and then manually moved to a WiFi controller within a group that serves the target mobile subscriber market.

It would therefore be desirable to have systems and methods of discovering and registering with a WiFi controller by a wireless access point that can overcome at least some of the drawbacks of existing WiFi controller discovery and registration systems and methods.

SUMMARY

In accordance with the present application, systems and methods of discovering and registering with a Wireless Fidelity (WiFi) controller by a wireless access point are disclosed that can provide location awareness in the WiFi controller discovery and registration process. The disclosed systems and methods employ a GeoAware domain name system (DNS) server that can receive a DNS query message containing the fully qualified domain name (FQDN) of a WiFi controller from a wireless access point, and compare the FQDN of the WiFi controller and the source IP address of the DNS query message against a mapping table, which maps predetermined FQDNs of WiFi controllers and predetermined ranges of source IP addresses of DNS query messages to specified groups of WiFi controllers. By comparing the FQDN of the WiFi controller and the source IP address of the DNS query message against such a mapping table, the GeoAware DNS server can resolve the FQDN of the WiFi controller to one or more IP addresses of a group of WiFi controllers, which can belong to a particular broadband service provider, and/or serve a target market of mobile subscribers located within a particular geographical area.

In one aspect, a system for discovering and registering with a WiFi controller by a wireless access point includes at least one wireless access point, a dynamic host configuration protocol (DHCP) server, a domain name system (DNS) server, one or more wireless management systems (WMSs), and one or more WiFi controllers. For example, the wireless access point may be a so-called "lightweight" wireless access point that can be configured in combination with a WiFi controller to support Hotspot 2.0, which is a technology based on the Institute of Electrical and Electronic Engineers (IEEE) 802.11u, 802.11i, and 802.1x standards and generally known as WiFi-certified Passpoint™, or any other suitable wireless hotspot technology. In an exemplary aspect, the wireless access point, the DHCP server, the DNS server, and the WMSs can each be communicably coupled to a first Internet protocol (IP) sub-network, the WiFi controllers can each be communicably coupled to a second IP sub-network, and the first and second IP sub-networks can be coupled to one another by a gateway router. The wireless access point can be deployed within a wireless local area network (WLAN), such as a WiFi network that conforms to one or more of the IEEE 802.11 series of standards. Further, the DNS server (also referred to herein as the "WiFi-Geo-DNS server") on the first IP sub-network can be configured to provide location awareness in the wireless access point's discovery of and registration with a WiFi controller on the second IP sub-network.

In one mode of operation, the wireless access point can perform a process of discovering and registering with a WiFi controller, as follows. Upon booting-up, the wireless access point can obtain an IP address by broadcasting a DHCP discover message over the first IP sub-network. The DHCP server on the first IP sub-network can receive the DHCP discover message, and send a unicast DHCP offer message over the first IP sub-network to the wireless access point. In an exemplary aspect, the DHCP offer message can contain an IP address for the wireless access point on the first IP sub-network, as well as the IP address of the WiFi-Geo-DNS server on the first IP sub-network. The DHCP offer message can further contain vendor specific information in an option field (e.g., the option field corresponding to DHCP option 43), which can include the FQDN (e.g., vendorname-controller.carriername.com) of a WiFi controller. Having received the DHCP offer message from the DHCP server, the wireless access point can attempt to resolve the FQDN of the WiFi controller by sending a unicast DNS query message over the first IP sub-network to the IP address of the WiFi-Geo-DNS server. The WiFi-Geo-DNS server on the first IP sub-network can receive the DNS query message, which can contain at least the FQDN of the WiFi controller and the source IP address of the DNS query message. In a further exemplary aspect, the WiFi-Geo-DNS server on the first IP sub-network can be configured to implement a mapping table that maps predetermined FQDNs of WiFi controllers and predetermined ranges of source IP addresses of DNS query messages to specified groups of WiFi controllers on the second IP sub-network, based at least in part on the configuration of the respective WiFi controllers.

Having received the DNS query message from the wireless access point, the WiFi-Geo-DNS server on the first IP sub-network can compare the FQDN of the WiFi controller and the source IP address of the DNS query message against the mapping table in order to resolve the FQDN of the WiFi controller to one or more IP addresses of a particular group of WiFi controllers on the second IP sub-network. For example, such a group of WiFi controllers on the second IP sub-network may belong to a particular broadband service provider, and/or serve a target market of mobile subscribers located within a particular geographical area. In an exemplary aspect, the mapping table implemented by the WiFi-Geo-DNS server can further map the predetermined FQDNs of WiFi controllers and the predetermined ranges of source IP addresses of DNS query messages to specified wireless management systems (WMSs). Further, the WiFi-Geo-DNS server on the first IP sub-network can compare the FQDN of the WiFi controller and the source IP address of the DNS query message against the mapping table in order to obtain the IP address of a particular WMS, such as one of the WMSs on the first IP sub-network. For example, each WMS on the first IP sub-network may be configured to monitor, provision, and/or record certain operating conditions and/or configurations of one or more of the WiFi controllers on the second IP sub-network, such as the WiFi controller's total capacity for registering wireless access points, current wireless access point load, host name, platform, master controller flag, wireless access point-manager address, and/or any other suitable information pertaining to the respective WiFi controller.

Having resolved the FQDN of the WiFi controller to the IP address(es) of a particular group of WiFi controllers on the second IP sub-network, and obtained the IP address of one of the WMSs on the first IP sub-network, the WiFi-Geo-DNS server can send a unicast query message over the first IP sub-network to the IP address of the WMS in order to request information such as the total capacity for registering wireless access points, the current wireless access point load, etc., of each member of the particular group of WiFi controllers. The WMS on the first IP sub-network can receive the query message from the WiFi-Geo-DNS server, and send a unicast response message over the first IP sub-network to the IP address of the WiFi-Geo-DNS server, in which the response message contains the WiFi controller information requested in the query message. Upon receipt of the response message from the WMS, the WiFi-Geo-DNS server can use the WiFi controller information contained in the response message to prepare an ordered list of candidate WiFi controllers for the wireless access point. In an exemplary aspect, the WiFi-Geo-DNS server can also send a unicast provisioning message over the first IP sub-network to the IP address of the WMS, in which the provisioning message contains at least the media access control (MAC) address of the wireless access point, as well as the IP addresses of one or more of the WiFi controllers in the ordered list. The WMS on the first IP sub-network can receive the provisioning message from the WiFi-Geo-DNS server, and, in turn, send one or more unicast provisioning messages over the second IP sub-network to the IP addresses of the WiFi controllers in order to pre-provision the respective WiFi controllers with information pertaining to the wireless access point. Such pre-provisioning of the respective WiFi controllers with the wireless access point's information can advantageously serve as an added security measure in the WiFi controller discovery and registration process.

Having sent the provisioning message to the WMS, the WiFi-Geo-DNS server can send a unicast DNS response message over the first IP sub-network to the IP address of the wireless access point, in which the DNS response message contains the ordered list of candidate WiFi controllers, including the IP address of each WiFi controller in the ordered list. Because the list of candidate WiFi controllers has been ordered (e.g., from the most favorable to the least favorable) by the WiFi-Geo-DNS server based, for example, on each WiFi controller's total capacity, current loading conditions, etc., the wireless access point can select the first WiFi controller (or any other suitable WiFi controller) in the ordered list, and register with the selected WiFi controller by sending a join request message to the IP address of the WiFi controller. Such a join request message can contain a certificate (e.g., an X.509 certificate) for the wireless access point that the selected WiFi controller can validate. Once the wireless access point's certificate is validated, the selected WiFi controller can send a join response message to the IP address of the wireless access point. Such a join response message can include a certificate (e.g., an X.509 certificate) for the selected WiFi controller that the wireless access point can likewise validate. Once the selected WiFi controller's certificate is validated, the wireless access point's discovery and registration process with the selected WiFi controller is completed. Using the selected WiFi controller, the wireless access point can then provide WiFi network access services to WiFi-enabled device(s) that come within its communication range within the WiFi network.

By providing a WiFi-Geo-DNS server that can (1) implement a mapping table, in which predetermined FQDNs of WiFi controllers and predetermined ranges of source IP addresses of DNS query messages are mapped to specified groups of WiFi controllers based at least in part on the configuration of the respective WiFi controllers, and (2) compare the FQDN of a WiFi controller and the source IP address of a DNS query message against the mapping table, the FQDN of the WiFi controller can be advantageously resolved to one or more IP addresses of a group of WiFi controllers, each of which may belong to a particular broadband service provider and/or serve a target market of mobile subscribers located within a particular geographical area.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein, and, together with the Detailed Description, explain these embodiments. In the drawings.

DETAILED DESCRIPTION

Systems and methods of discovering and registering with a Wireless Fidelity (WiFi) controller by a wireless access point are disclosed that can provide location awareness in the WiFi controller discovery and registration process. The disclosed systems and methods employ a GeoAware domain name system (DNS) server that can receive a DNS query message containing the fully qualified domain name (FQDN) of a WiFi controller from a wireless access point, and compare the FQDN of the WiFi controller and the source IP address of the DNS query message against a mapping table, which maps predetermined FQDNs of WiFi controllers and predetermined ranges of source IP addresses of DNS query messages to specified groups of WiFi controllers. By comparing the FQDN of the WiFi controller and the source IP address of the DNS query message against such a mapping table, the GeoAware DNS server can resolve the FQDN of the WiFi controller to one or more IP addresses of a group of WiFi controllers, which can belong to a particular broadband service provider, and/or serve a target market of mobile subscribers located within a particular geographical area.

Figure 1:
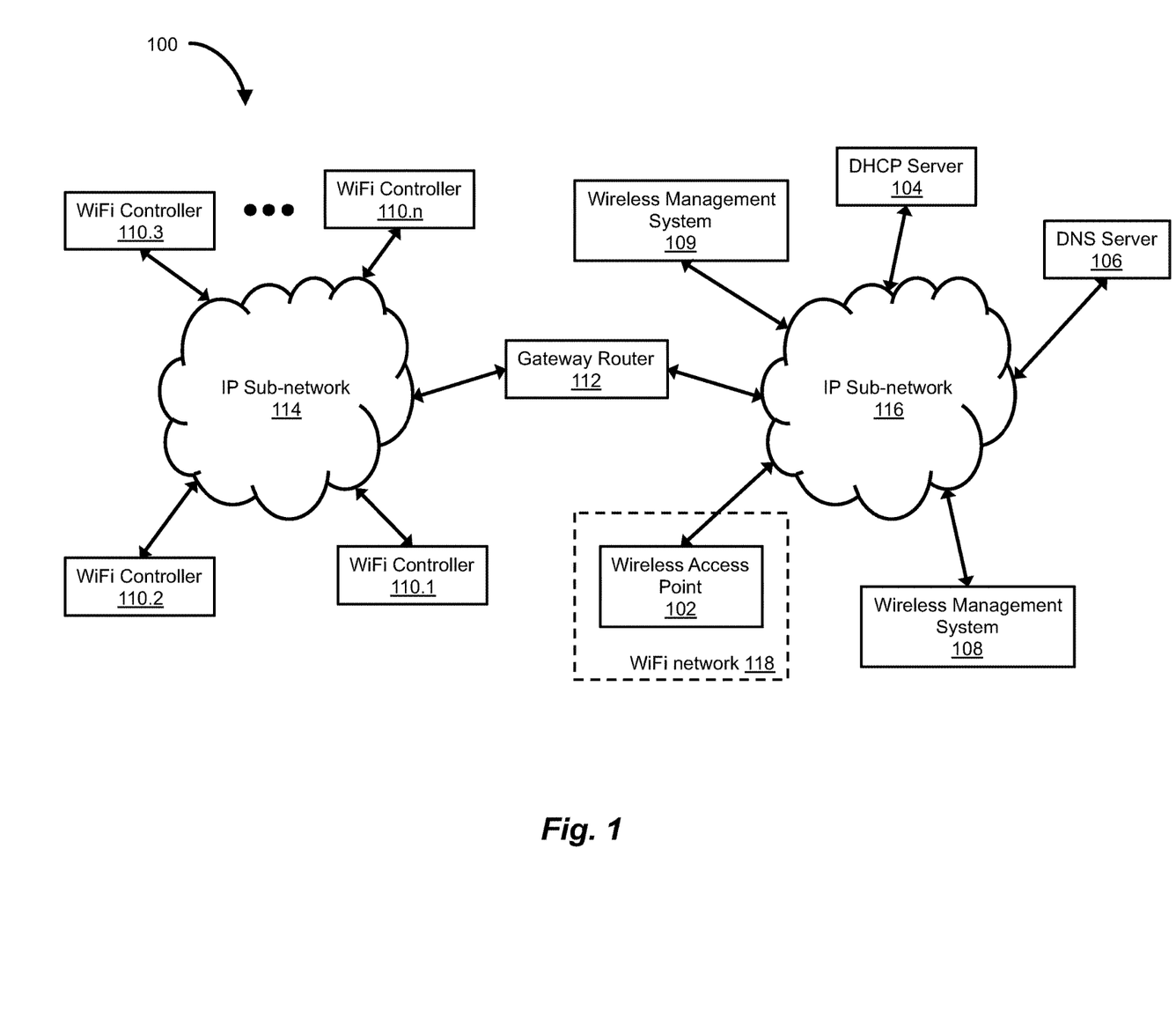
FIG. 1 is a block diagram illustrating an exemplary system for discovering and registering with a WiFi controller by a wireless access point, in accordance with the present application.

FIG. 1 depicts an illustrative embodiment of an exemplary system 100 for discovering and registering with a WiFi controller by a wireless access point, in accordance with the present application. As shown in FIG. 1, the system 100 includes at least one wireless access point 102, a dynamic host configuration protocol (DHCP) server 104, a domain name system (DNS) server 106, one or more wireless management systems (WMSs) 108, 109, and one or more WiFi controllers 110.1, 110.2, 110.3, . . . , 110.n. For example, the wireless access point 102 may be a so-called "lightweight" wireless access point that can be configured in combination with a WiFi controller to support Hotspot 2.0, which is a technology based on the Institute of Electrical and Electronic Engineers (IEEE) 802.11u, 802.11i, and 802.1x standards and generally known as WiFi-certified Passpoint™, or any other suitable wireless hotspot technology. In one embodiment, the wireless access point 102, the DHCP server 104, the DNS server 106, and the WMSs 108, 109 can each be communicably coupled to a first Internet protocol (IP) sub-network 116, and the WiFi controllers 110.1-110.n can each be communicably coupled to a second IP sub-network 114. Further, the first and second IP sub-networks 114, 116 can be communicably coupled to one another by a gateway router 112. The wireless access point 102 can be deployed within a wireless local area network (WLAN), such as a WiFi network 118 that conforms to one or more of the IEEE 802.11 series of standards. The DNS server 106 (also referred to herein as the "WiFi-Geo-DNS server") on the first IP sub-network 116 can be configured to provide location awareness in the wireless access point's discovery of and registration with one of the WiFi controllers 110.1-110.n on the second IP sub-network 114. The DHCP server 104 can be configured to conform to the dynamic host configuration protocol, as defined in RFC 2132 DHCP Options and BOOTP Vendor Extensions, March 1997, RFC 3315 Dynamic Host Configuration Protocol for IPv6 (DHCPv6), July 2003, and/or latest update(s). The DNS server 106 can be configured to conform to the domain name concepts, facilities, implementations, and/or specifications, as defined in RFC 1034 Domain Names—Concepts and Facilities, November 1987, RFC 1035 Domain Names—Implementation and Specification, November 1987, and/or latest update(s).

Figure 2:
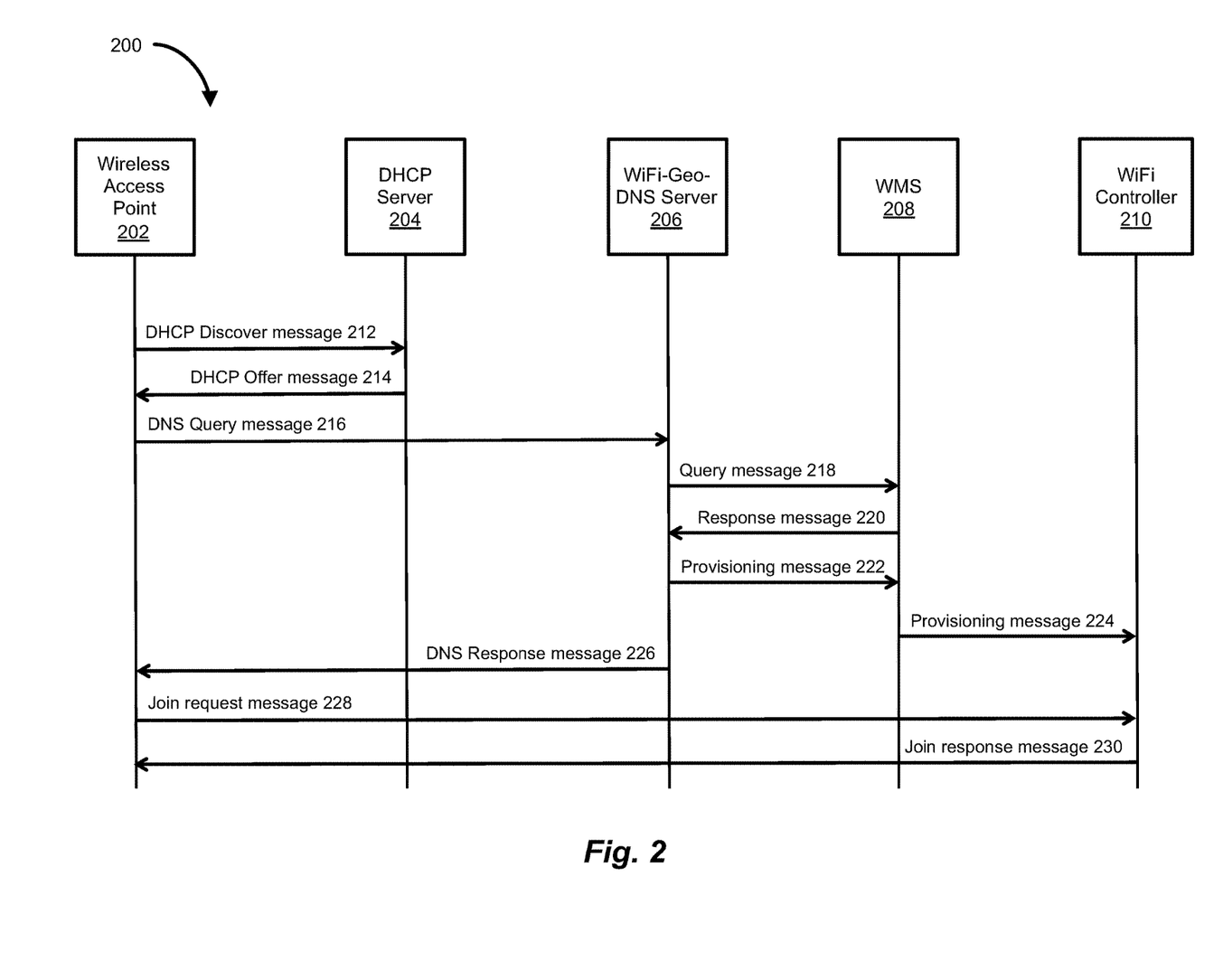
FIG. 2 is signaling diagram illustrating an exemplary approach to providing location awareness in a wireless access point's discovery of and registration with a Wireless Fidelity (WiFi) controller included in the system of FIG. 1.

FIG. 2 depicts an exemplary approach 200 to providing location awareness in a wireless access point's discovery of and registration with a WiFi controller 210. For example, with reference to FIGS. 1 and 2, a wireless access point 202 (see FIG. 2) may correspond to the wireless access point 102 (see FIG. 1), a DHCP server 204 (see FIG. 2) may correspond to the DHCP server 104 (see FIG. 1), a WiFi-Geo-DNS server 206 (see FIG. 2) may correspond to the DNS server 106 (see FIG. 1), a WMS 208 (see FIG. 2) may correspond to the WMS 108 or 109 (see FIG. 1), and the WiFi controller 210 (see FIG. 2) may correspond to one of the WiFi controllers 110.1-110.$n$ (see FIG. 1). The exemplary approach 200 illustrated in FIG. 2 allows the FQDN of a WiFi controller to be resolved to one or more IP addresses of a group of WiFi controllers, each of which can belong to a particular broadband service provider and/or serve a target market of mobile subscribers located within a particular geographical area.

In an exemplary mode of operation, the wireless access point 202 (see FIG. 2) can perform a process of discovering and registering with the WiFi controller 210, as follows. Upon booting-up, the wireless access point 202 can obtain an IP address by broadcasting a DHCP discover message 212 over a first IP sub-network (such as the first IP sub-network 116; see FIG. 1). The DHCP server 204 on the first IP sub-network can receive the DHCP discover message 212, and send a unicast DHCP offer message 214 over the first IP sub-network to the wireless access point 202. In one embodiment, the DHCP offer message 214 can contain an IP address for the wireless access point 202 on the first IP sub-network, as well as the IP address of the WiFi-Geo-DNS server 206 on the first IP sub-network. The DHCP offer message 214 can further contain vendor specific information in an option field (e.g., the option field corresponding to DHCP option 43; see RFC 2132 referenced herein), which can include the FQDN (e.g., vendorname-controller.carriername.com, or any other suitable domain name format) of a WiFi controller. Having received the DHCP offer message 214 from the DHCP server 204, the wireless access point 202 can attempt to resolve the FQDN of the WiFi controller by sending a unicast DNS query message 216 over the first IP sub-network to the IP address of the WiFi-Geo-DNS server 206. The WiFi-Geo-DNS server 206 on the first IP sub-network can receive the DNS query message 216, which can contain at least the FQDN of the WiFi controller and the source IP address of the DNS query message 216. In one embodiment, the WiFi-Geo-DNS server 206 on the first IP sub-network can be configured to implement a mapping table that maps predetermined FQDNs of WiFi controllers and predetermined ranges of source IP addresses of DNS query messages to specified groups of WiFi controllers on a second IP sub-network (such as the second IP sub-network 114; see FIG. 1) based at least in part on the configuration of the respective WiFi controllers. Having received the DNS query message 216 from the wireless access point 202, the WiFi-Geo-DNS server 206 on the first IP sub-network can compare the FQDN of the WiFi controller and the source IP address of the DNS query message 216 against the mapping table in order to resolve the FQDN of the WiFi controller to one or more IP addresses of a particular group of WiFi controllers on the second IP sub-network.

Figure 3:
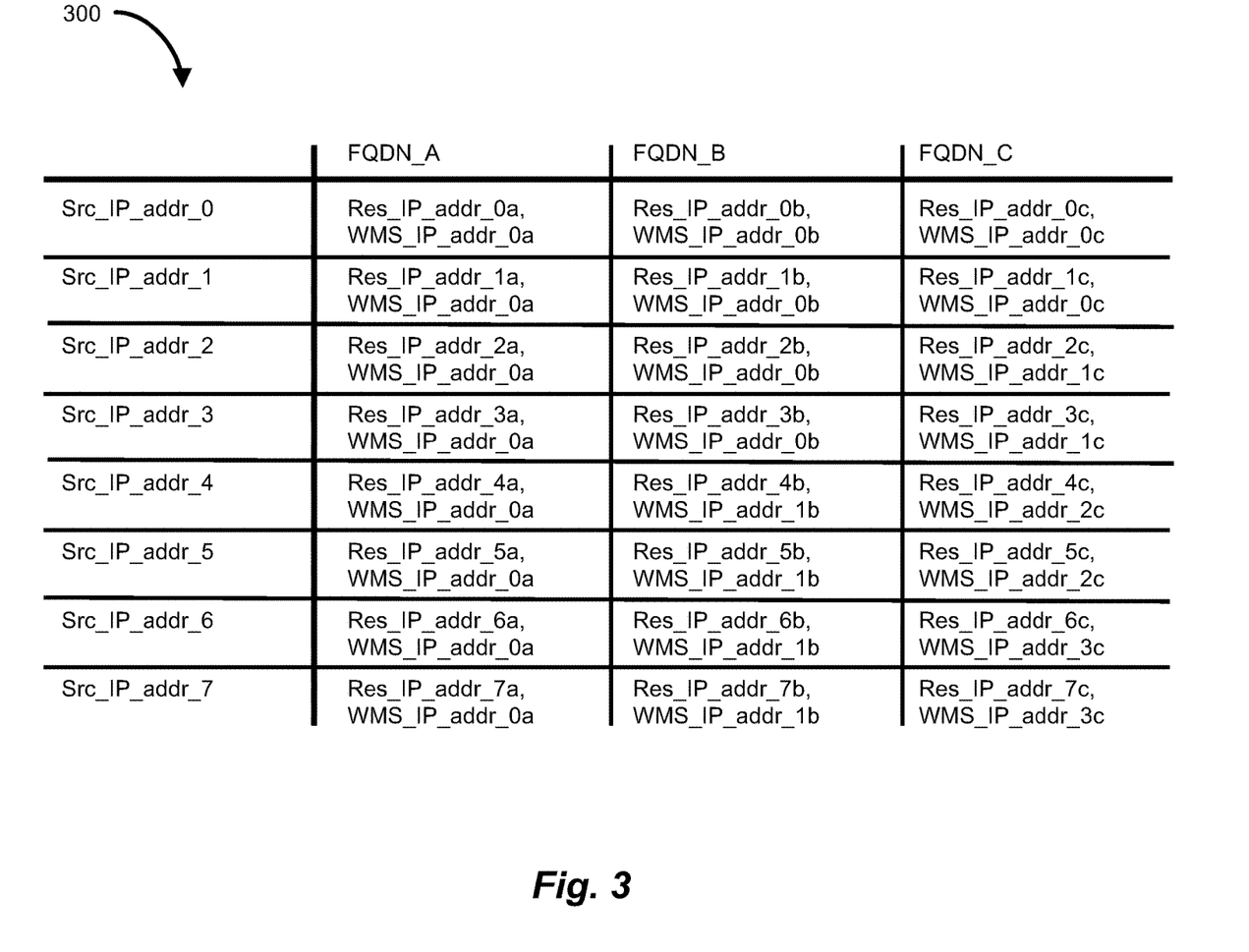
FIG. 3 is an exemplary mapping table implemented by a domain name system (DNS) server included in the system of FIG. 1.

FIG. 3 depicts an illustrative representation of an exemplary mapping table 300 that can be implemented by the WiFi-Geo-DNS server 206 of FIG. 2. As shown in FIG. 3, the mapping table 300 maps a plurality of predetermined FQDNs of WiFi controllers (such FQDNs being represented as "FQDN_A," "FQDN_B," and "FQDN_C"; see FIG. 3) and predetermined ranges of source IP addresses of DNS query messages (such source IP addresses being represented as "Src_IP_addr_0," "Src_IP_addr_1," "Src_IP_addr_2," "Src_IP_addr_3," "Src_IP_addr_4," "Src_IP_addr_5," "Src_IP_addr_6," and "Src_IP_addr_7"; see FIG. 3) to specified groups of WiFi controllers on the second IP sub-network. The WiFi-Geo-DNS server 206 can compare the FQDN of the WiFi controller provided in the DNS query message 216, as well as the source IP address of the DNS query message 216, against the mapping table 300 in order to resolve the FQDN of the WiFi controller to one or more IP addresses of a particular group of WiFi controllers. It is noted that the plurality of predetermined FQDNs of WiFi controllers represented as FQDN_A, FQDN_B, and FQDN_C, as well as the predetermined ranges of source IP addresses of DNS query messages represented as Src_IP_addr_0, Src_IP_addr_1, Src_IP_addr_2, Src_IP_addr_3, Src_IP_addr_4, Src_IP_addr_5, Src_IP_addr_6, and/or Src_IP_addr_7, are described herein for purposes of illustration only, and that any suitable FQDNs and/or source IP address ranges may be employed.

For example, with reference to the mapping table 300 of FIG. 3, if the FQDN of the WiFi controller were represented as FQDN_A, the source IP address of the DNS query message 216 were represented as Src_IP_addr_0, and the predetermined range of source IP addresses were represented as Src_IP_addr_0 through Src_IP_addr_7, then the WiFi-Geo-DNS server 206 may resolve the FQDN_A of the WiFi controller to a plurality of IP addresses represented as "Res_IP_addr_0a," "Res_IP_addr_1a," "Res_IP_addr_2a," "Res_IP_addr_3a," "Res_IP_addr_4a," "Res_IP_addr_5a," "Res_IP_addr_6a," and "Res_IP_addr_7a" (see FIG. 3).

With further reference to the mapping table 300 of FIG. 3, if, for example, the FQDN of the WiFi controller were represented as FQDN_B, the source IP address of the DNS query message 216 were represented as Src_IP_addr_0, and the predetermined range of source IP addresses were represented as Src_IP_addr_0 through Src_IP_addr_3, then the WiFi-Geo-DNS server 206 may resolve the FQDN_B of the WiFi controller to a plurality of IP addresses represented as "Res_IP_addr_0b," "Res_IP_addr_1b," "Res_IP_addr_2b," and "Res_IP_addr_3b" (see FIG. 3). Likewise, if, for example, the FQDN of the WiFi controller were represented as FQDN_B, the source IP address of the DNS query message 216 were represented as Src_IP_addr_0, and the predetermined range of source IP addresses were represented as Src_IP_addr_4 through Src_IP_addr_7, then the WiFi-Geo-DNS server 206 may resolve the FQDN_B of the WiFi controller to a plurality of IP addresses represented as "Res_IP_addr_4b," "Res_IP_addr_5b," "Res_IP_addr_6b," and "Res_IP_addr_7b" (see FIG. 3).

With still further reference to the mapping table 300 of FIG. 3, if, for example, the FQDN of the WiFi controller were represented as FQDN_C, the source IP address of the DNS query message 216 were represented as Src_IP_addr_0, and the predetermined range of source IP addresses were represented as Src_IP_addr_0 to Src_IP_addr_1, then the WiFi-Geo-DNS server 206 may resolve the FQDN_C of the WiFi controller to a plurality of IP addresses represented as "Res_IP_addr_0c" and "Res_IP_addr_1c" (see FIG. 3). Likewise, if, for example, the FQDN of the WiFi controller were represented as FQDN_C, the source IP address of the DNS query message 216 were represented as Src_IP_addr_2, and the predetermined range of source IP addresses were represented as Src_IP_addr_2 to Src_IP_addr_3, then the WiFi-Geo-DNS server 206 may resolve the FQDN_C of the WiFi controller to a plurality of IP addresses represented as "Res_IP_addr_2c" and "Res_IP_addr_3c" (see FIG. 3). If, for example, the FQDN of the WiFi controller were represented as FQDN_C, the source IP address of the DNS query message 216 were represented as Src_IP_addr_4, and the predetermined range of source IP addresses were represented as Src_IP_addr_4 to Src_IP_addr_5, then the WiFi-Geo-DNS server 206 may resolve the FQDN_C of the WiFi controller to a plurality of IP addresses represented as "Res_IP_addr_4c" and "Res_IP_addr_5c" (see FIG. 3). If, for example, the FQDN of the WiFi controller were represented as FQDN_C, the source IP address of the DNS query message 216 were represented as Src_IP_addr_6, and the predetermined range of source IP addresses were represented as Src_IP_addr_6 to Src_IP_addr_7, then the WiFi-Geo-DNS server 206 may resolve the FQDN_C of the WiFi controller to a plurality of IP addresses represented as "Res_IP_addr_6c" and "Res_IP_addr_7c" (see FIG. 3).

In one embodiment, the mapping table 300 (see FIG. 3) implemented by the WiFi-Geo-DNS server 206 (see FIG. 2) can further map the predetermined FQDNs of WiFi controllers and the predetermined ranges of source IP addresses of DNS query messages to specified wireless management systems (WMSs). Further, the WiFi-Geo-DNS server 206 on the first IP sub-network can compare the FQDN of the WiFi controller and the source IP address of the DNS query message against the mapping table 300 in order to obtain the IP address of a particular WMS, such as the WMS 208 on the first IP sub-network. For example, the WMS 208 on the first IP sub-network may be configured to monitor, provision, and/or record certain operating conditions and/or configurations of the WiFi controller 210 on the second IP sub-network, such as the WiFi controller's total capacity for registering wireless access points, current wireless access point load, host name, platform, master controller flag, wireless access point-manager address, and/or any other suitable information pertaining to the WiFi controller 210. For example, with reference to the mapping table 300 (see FIG. 3), if the FQDN of the WiFi controller were represented as FQDN_A, the source IP address of the DNS query message 216 were represented as Src_IP_addr_0, and the predetermined range of source IP addresses were represented as Src_IP_addr_0 through Src_IP_addr_7, then the WiFi-Geo-DNS server 206 may obtain from the mapping table 300 the IP address of the WMS 208 (see FIG. 2) represented as "WMS_IP_addr_0a" (see FIG. 3).

With further reference to the mapping table 300 of FIG. 3, if, for example, the FQDN of the WiFi controller were represented as FQDN_B, the source IP address of the DNS query message 216 were represented as Src_IP_addr_0, and the predetermined range of source IP addresses were represented as Src_IP_addr_0 through Src_IP_addr_3, then the WiFi-Geo-DNS server 206 may obtain from the mapping table 300 the IP address of the WMS 208 (see FIG. 2) represented as "WMS_IP_addr_0b" (see FIG. 3). Likewise, if, for example, the FQDN of the WiFi controller were represented as FQDN_B, the source IP address of the DNS query message 216 were represented as Src_IP_addr_4, and the predetermined range of source IP addresses were represented as Src_IP_addr_4 through Src_IP_addr_7, then the WiFi-Geo-DNS server 206 may obtain from the mapping table 300 the IP address of the WMS 208 (see FIG. 2) represented as "WMS_IP_addr_1b" (see FIG. 3).

With still further reference to the mapping table 300 of FIG. 3, if, for example, the FQDN of the WiFi controller were represented as FQDN_C, the source IP address of the DNS query message 216 were represented as Src_IP_addr_0, and the predetermined range of source IP addresses were represented as Src_IP_addr_0 to Src_IP_addr_1, then the WiFi-Geo-DNS server 206 may obtain from the mapping table 300 the IP address of the WMS 208 (see FIG. 2) represented as "WMS_IP_addr_0c" (see FIG. 3). Likewise, if, for example, the FQDN of the WiFi controller were represented as FQDN_C, the source IP address of the DNS query message 216 were represented as Src_IP_addr_2, and the predetermined range of source IP addresses were represented as Src_IP_addr_2 to Src_IP_addr_3, then the WiFi-Geo-DNS server 206 may obtain from the mapping table 300 the IP address of the WMS 208 (see FIG. 2) represented as "WMS_IP_addr_1c" (see FIG. 3). If, for example, the FQDN of the WiFi controller were represented as FQDN_C, the source IP address of the DNS query message 216 were represented as Src_IP_addr_4, and the predetermined range of source IP addresses were represented as Src_IP_addr_4 to Src_IP_addr_5, then the WiFi-Geo-DNS server 206 may obtain from the mapping table 300 the IP address of the WMS 208 (see FIG. 2) represented as "WMS_IP_addr_2c" (see FIG. 3). If, for example, the FQDN of the WiFi controller were represented as FQDN_C, the source IP address of the DNS query message 216 were represented as Src_IP_addr_6, and the predetermined range of source IP addresses were represented as Src_IP_addr_6 to Src_IP_addr_7, then the WiFi-Geo-DNS server 206 may obtain from the mapping table 300 the IP address of the WMS 208 (see FIG. 2) represented as "WMS_IP_addr_3c" (see FIG. 3).

Having resolved the FQDN of the WiFi controller to the IP address(es) (e.g., Res_IP_addr_0a, Res_IP_addr_1a, Res_IP_addr_2a, Res_IP_addr_3a, Res_IP_addr_4a, Res_IP_addr_5a, Res_IP_addr_6a, and/or Res_IP_addr_7a) of a particular group of WiFi controllers on the second IP sub-network, and obtained the IP address of the WMS 208 on the first IP sub-network, the WiFi-Geo-DNS server 206 can send a unicast query message 218 over the first IP sub-network to the IP address of the WMS 208 in order to request information such as the total capacity for registering wireless access points, the current wireless access point load, etc., of each member of the particular group of WiFi controllers. For example, WMS 208 may be configured to dynamically access the load conditions of the respective WiFi controllers. In an alternative embodiment, the WiFi-Geo-DNS server 206 may be configured to execute a static round robin load-balancing algorithm locally. The WMS 208 on the first IP sub-network can receive the query message 218 from the WiFi-Geo-DNS server 206, and send a unicast response message 220 over the first IP sub-network to the IP address of the WiFi-Geo-DNS server 206, in which the response message 220 contains the WiFi controller information requested in the query message 218. Upon receipt of the response message 220 from the WMS 208, the WiFi-Geo-DNS server 206 can use the WiFi controller information contained in the response message 220 to prepare an ordered list of candidate WiFi controllers for the wireless access point 202. In one embodiment, the WiFi controller 210 can be positioned "first" in the order list, thereby indicating that the WiFi controller 210 is considered to be the most favorable for use by the wireless access point 202. Further, the WiFi-Geo-DNS server 206 can send a unicast provisioning message 222 over the first IP sub-network to the IP address of the WMS 208, in which the provisioning message 222 contains at least the media access control (MAC) address of the wireless access point 202 and the IP address of the WiFi controller 210. For example, the WiFi-Geo-DNS server 206 may obtain the MAC address of the wireless access point 202 by sending a DHCP query message (not shown) to the DHCP server 204, and receiving a DHCP response message (not shown) containing the MAC address of the wireless access point 202 from the DHCP server 204. The WMS 208 on the first IP sub-network can receive the provisioning message 222 from the WiFi-Geo-DNS server 206, and, in turn, send a unicast provisioning message 224 over the second IP sub-network to the IP address of the WiFi controller 210 in order to pre-provision the WiFi controller 210 with information (e.g., the group setting) pertaining to the wireless access point 202. Such pre-provisioning of the WiFi controller 210 with the wireless access point's information can serve as an added security measure in the WiFi controller discovery and registration process.

Having sent the provisioning message 222 to the WMS 208, the WiFi-Geo-DNS server 206 can send a unicast DNS response message 226 over the first IP sub-network to the IP address of the wireless access point 202, in which the DNS response message 226 contains the ordered list of candidate WiFi controllers, which includes the IP address of the WiFi controller 210. Because the list of candidate WiFi controllers has been ordered (e.g., from the most favorable to the least favorable) by the WiFi-Geo-DNS server 206 based, for example, on each WiFi controller's total capacity, current loading conditions, etc., the wireless access point 202 can select the WiFi controller 210 (or any other suitable WiFi controller) in the ordered list, and register with the selected WiFi controller 210 by sending a join request message 228 to the IP address of the WiFi controller 210. Such a join request message 228 can contain a certificate (e.g., an X.509 certificate) for the wireless access point 202 that the WiFi controller 210 can validate. Once the wireless access point's certificate is validated, the WiFi controller 210 can send a join response message 230 to the IP address of the wireless access point 202. Such a join response message 230 can include a certificate (e.g., an X.509 certificate) for the WiFi controller 210 that the wireless access point 202 can likewise validate. Once the WiFi controller's certificate is validated, the wireless access point's discovery and registration process with the WiFi controller 210 is completed. Using the WiFi controller 210, the wireless access point 202 can then provide WiFi network access services to WiFi-enabled device(s) that come within its communication range within the WiFi network (such as the WiFi network 118; see FIG. 1).

Figure 4:
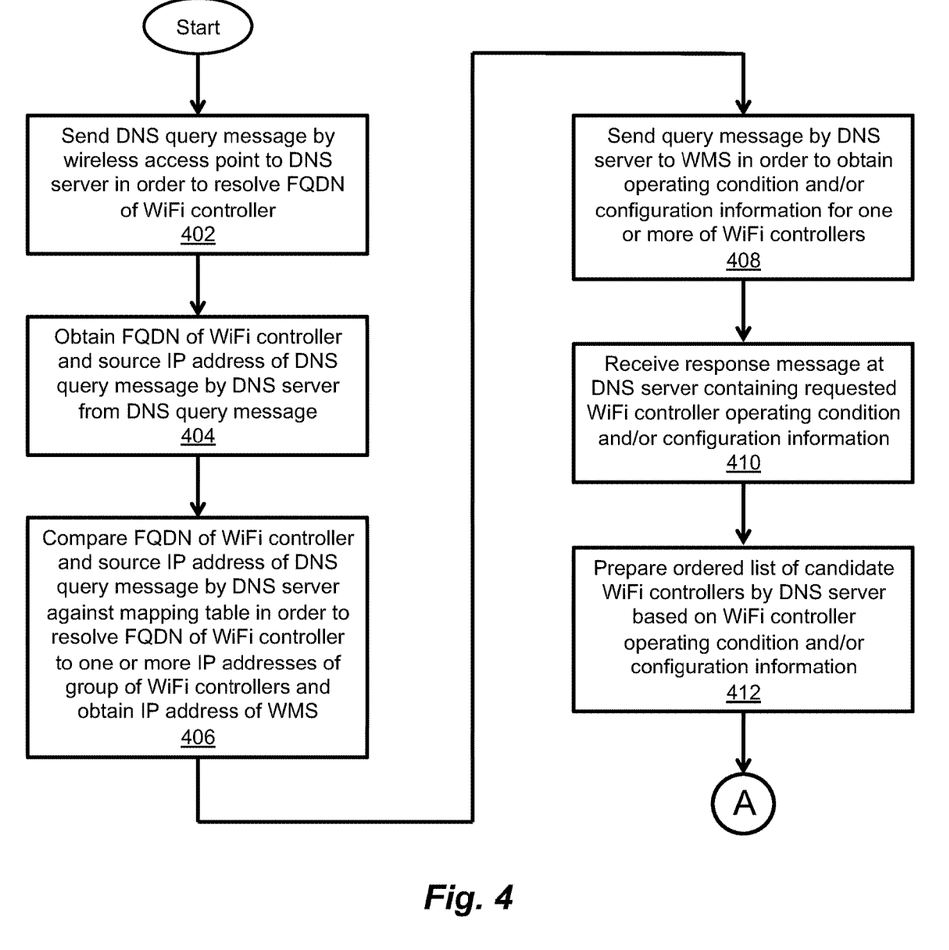
FIG. 4 is a flow diagram of an exemplary method of providing location awareness in the wireless access point's discovery of and registration with the WiFi controller included in the system of FIG. 1.

An exemplary method of providing location awareness in a wireless access point's discovery of and registration with a WiFi controller is described herein with reference to FIG. 4. As depicted in block 402, a DNS query message is sent, by a wireless access point, to a DNS server in order to resolve the FQDN of a WiFi controller. As depicted in block 404, the FQDN of the WiFi controller and the source IP address of the DNS query message are obtained, by the DNS server, from the DNS query message. As depicted in block 406, the FQDN of the WiFi controller and the source IP address of the DNS query message are compared, by the DNS server, against a mapping table in order to resolve the FQDN of the WiFi controller to one or more IP addresses of a group of WiFi controllers, and to obtain the IP address of a WMS. As depicted in block 408, a query message is sent, by the DNS server, to the WMS in order to obtain operating condition and/or configuration information for one or more of the WiFi controllers. As depicted in block 410, a response message is received, at the DNS server, containing the requested WiFi controller operating condition and/or configuration information. As depicted in block 412, an ordered list of candidate WiFi controllers is prepared, by the DNS server, based on the WiFi controller operating condition and/or configuration information. As depicted in block 414, a first provisioning message is sent, by the DNS server to the WMS, containing the IP addresses of one or more WiFi controllers in the ordered list, as well as the MAC address of the wireless access point. As depicted in block 416, a second provisioning message is sent, by the WMS, to the IP addresses of the respective WiFi controllers contained in the first provisioning message in order to pre-provision the respective WiFi controllers with information pertaining to the wireless access point. As depicted in block 418, a DNS response message is sent, by the DNS server to the wireless access point, containing the ordered list of candidate WiFi controllers. As depicted in block 420, a WiFi controller is selected, by the wireless access point, from the ordered list of WiFi controllers. As depicted in block 422, a join request message is sent, by the wireless access point, to the selected WiFi controller. As depicted in block 424, a join response message is received, at the wireless access point from the selected WiFi controller, thereby completing the WiFi controller discovery and registration process.

Having described the foregoing illustrative embodiments, it will be apparent that other variations and/or modifications may be made and/or practiced. For example, with reference to FIG. 3, it was described that the mapping table 300 can map a plurality of predetermined FQDNs of WiFi controllers and predetermined ranges of source IP addresses of DNS query messages to specified groups of WiFi controllers, as well as to specified wireless management systems (WMSs). In an alternative embodiment, the mapping table 300 can be configured to simply map the plurality of predetermined FQDNs of WiFi controllers and the predetermined ranges of source IP addresses of DNS query messages to the specified WMSs. In such an embodiment, the WiFi-Geo-DNS server (such as the WiFi-Geo-DNS server 206; see FIG. 2) can receive, from a wireless access point (such as the wireless access point 202; see FIG. 2), a DNS query message that contains the FQDN of a WiFi controller and the source IP address of the DNS query message, and compare the FQDN of the WiFi controller and the source IP address of the DNS query message against the mapping table to obtain the IP address of a WMS (such as the WMS 208; see FIG. 2). The WiFi-Geo-DNS server can then send, to the IP address of the WMS, a query message that contains the MAC address and the IP address of the wireless access point. Based at least on the MAC address and IP address of the wireless access point, the WMS can allocate the IP address of a suitable WiFi controller in a response message to the WiFi-Geo-DNS server, which, in turn, can provide the IP address of the WiFi controller in a DNS response message to the wireless access point.

Figure 5:
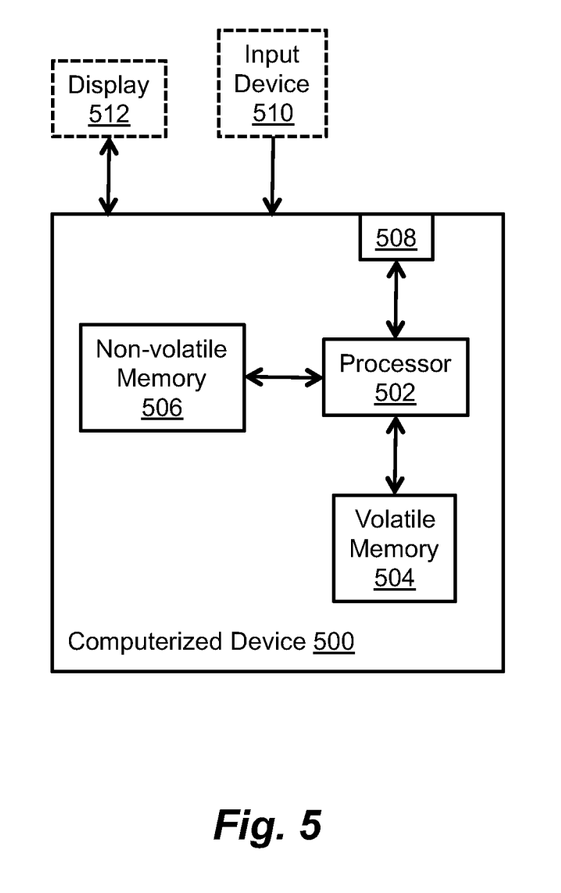
FIG. 5 is a block diagram of an exemplary computerized device upon which systems and methods described herein can be implemented.

A number of the exemplary systems and methods described herein can be implemented, at least in part, with any of a variety of server computers, client computers, and/or computerized devices. FIG. 5 depicts an illustrative embodiment of an exemplary computerized device 500, which includes a processor 502 coupled to a volatile memory 504 and a non-volatile memory 506. The computerized device 500 can further include a network access port 508 for establishing a data connection with other computer (s) and/or computerized device(s) over a network, as well as an input device 510 (a keyboard, a mouse, a track pad) and a display 512 (a liquid crystal display (LCD) display, a light emitting diode (LED) display).

Figure 6:
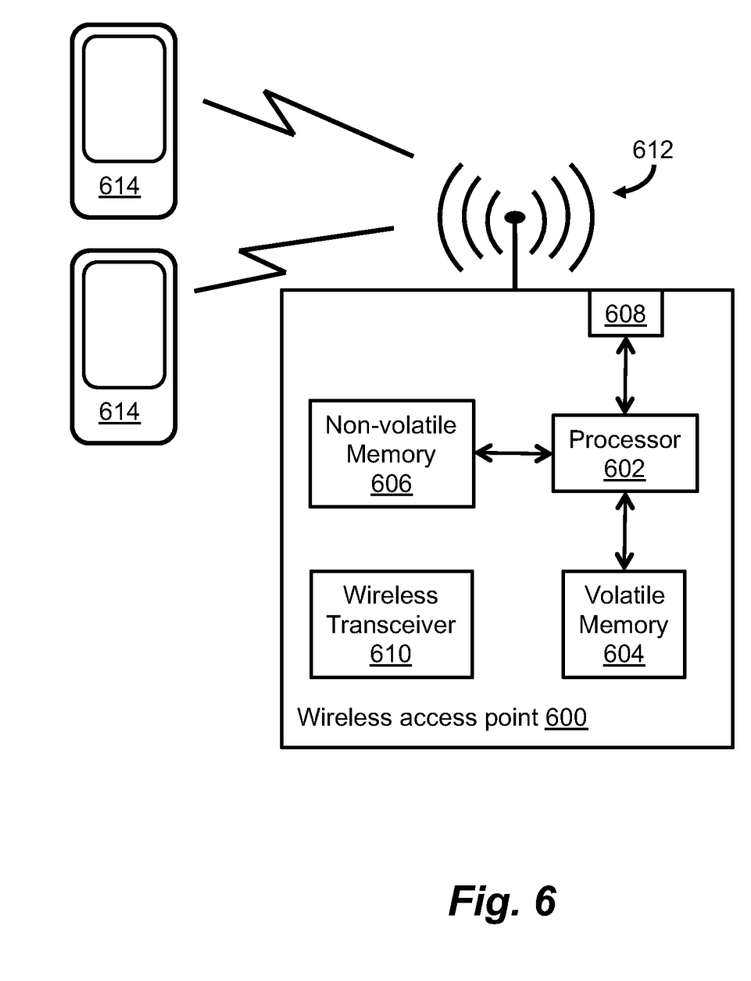
FIG. 6 is a block diagram of an exemplary wireless access point upon which systems and methods described herein can be implemented.

FIG. 6 depicts an illustrative embodiment of an exemplary computerized wireless access point 600, which includes a processor 602 coupled to a volatile memory 604 and a non-volatile memory 606. Like the computerized device 500 of FIG. 5, the wireless access point 600 of FIG. 6 can further include a network access port 608 for establishing a data connection with one or more computers and/or computerized devices over a network. The wireless access point 600 can still further include a wireless transceiver 610 for establishing wireless communications with one or more mobile devices 614 via an antenna 612. The wireless transceiver 610 can conform to the IEEE 802.11 series of standards, or any other suitable wireless standards.

The foregoing method descriptions and the process flow diagrams are provided herein merely as illustrative examples, and are not intended to require or imply that the steps of the various embodiments must be performed in the order presented. One of ordinary skill in the art will appreciate that the order of steps in the foregoing embodiments can be performed in any suitable order. Further, terms such as "thereafter," "then," "next," etc., are not intended to limit the order of the steps. In addition, any references to claim elements in the singular, e.g., using the articles "a," "an," or "the," are not to be construed as limiting the respective claim elements to the singular.

The various illustrative logical blocks, modules, circuits, and/or algorithmic steps described in connection with the embodiments disclosed herein can be implemented as electronic hardware, computer software, or combinations of both. To illustrate this interchangeability of hardware and software, various illustrative components, blocks, modules, circuits, and/or steps have been described herein generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present application. The functionality of various logical blocks described herein can be performed by any other suitable logical blocks and/or circuits, and/or any other suitable additional logical blocks and/or circuits that are not separately illustrated herein.

The hardware used to implement the various illustrative logical blocks, modules, and/or circuits described in connection with the aspects disclosed herein can be implemented or performed with a general purpose processor, a digital signal processor (DSP), an application specific integrated circuit (ASIC), a field programmable gate array (FPGA), and/or other programmable logic device, discrete gate or transistor logic, discrete hardware components, and/or any combination thereof designed to perform the functions described herein. A general purpose processor can be a microprocessor, however the processor can be any other suitable processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Alternatively, some blocks and/or methods described herein can be performed by circuitry that is specific to a given function.

In one or more exemplary aspects, the functions described herein can be implemented in hardware, software, firmware, or any combination thereof. If implemented in software, the functions can be stored as one or more instructions or code on a computer-readable medium. The blocks of a method or algorithm disclosed herein can be embodied in a processor-executable software module, which can reside on a computer-readable medium. Computer-readable media can include both computer storage media and communication media, including any medium that facilitates transfer of a computer program from one place to another. Storage media can be any available media that can be accessed by a computer. By way of example and not limitation, such computer-readable media can comprise RAM, ROM, EEPROM, CD-ROM or other optical disk storage, magnetic disk storage or other magnetic storage devices, and/or any other suitable medium that can be used to carry or store desired program code in the form of instructions and/or data structures and that can be accessed by a computer. Any connection can also be properly termed as a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of the medium. The terms "disk" and "disc," as employed herein, can include compact discs (CD), laser discs, optical discs, digital versatile discs (DVD), hard disks, floppy disks, and/or Blu-Ray discs. In addition, the operations of a method or algorithm can reside as one or any combination or set of codes and/or instructions on a machine readable medium and/or computer-readable medium, which can be incorporated into a computer program product.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

We claim:

1. A method comprising:
  receiving notification of a first identifier and a second identifier, the first identifier assigned to a wireless access point in a network environment, the second identifier assigned to a controller resource in the network environment;
  mapping the second identifier to a third identifier, the third identifier assigned to a wireless network controller;
  transmitting a message to the wireless access point, the message including the third identifier assigned to the wireless network controller, the message notifying the wireless access point that the wireless network controller assigned the third identifier has been provisioned to control the wireless access point; and
  wherein the first identifier and the second identifier are received from a first server resource, the first identifier being a source network address assigned to the wireless access point, the source network address supporting communications in the network environment.

2. The method as in claim 1 further comprising:
  receiving the first identifier and the second identifier in a communication from the wireless access point.

3. The method as in claim 1, wherein the third identifier is a network address assigned to the wireless network controller, the method further comprising:

communicating the message including the network address of the wireless network controller from a DNS (Domain Name Server) server resource to the wireless access point.

4. The method as in claim 1, wherein the message indicates identities of multiple network controllers selectable by the wireless access point, the identities of the multiple network controllers derived from the second identifier.

5. The method as in claim 1, wherein the mapping of the second identifier to the wireless network controller is based at least in part on a geographical location of the wireless access point.

6. The method as in claim 5, wherein the first server resource providing the notification of the first identifier and the second identifier to the wireless access point is aware of the geographical location of the wireless access point.

7. The method as in claim 1, wherein the second identifier is a domain name value assigned to the controller resource.

8. The method as in claim 7, wherein the domain name value is a fully qualified domain name value received from the wireless access point.

9. The method as in claim 1, wherein the first server resource notifies the wireless access point of network address information of a second server resource from which the first server resource obtains the third identifier assigned to the wireless network controller.

10. The method as in claim 1, wherein mapping the second identifier to the third identifier includes:
  detecting a geographical location of the wireless access point; and
  wherein the mapping of the second identifier to the wireless network controller is based at least in part on the geographical location of the wireless access point.

11. The method as in claim 1, wherein mapping the second identifier to the third identifier includes:
  communicating a provisioning message to the wireless network controller.

12. The method as in claim 11, wherein the wireless access point communicates a join request message to the wireless network subsequent to receiving the third identifier.

13. A method comprising:
  receiving notification of a first identifier and a second identifier, the first identifier assigned to a wireless access point in a network environment, the second identifier assigned to a controller resource in the network environment;
  mapping the second identifier to a third identifier, the third identifier assigned to a wireless network controller; and
  generating a message to the wireless access point, the message including the third identifier assigned to the wireless network controller, the method further comprising:
    receiving the first identifier and the second identifier in a message received from the wireless access point;
    wherein the wireless access point receives the first identifier and the second identifier from a first server resource, the first server resource assigning network addresses to resources in the network environment, the first identifier being a source network address assigned to the wireless access point, the source network address supporting communications in the network environment.

14. The method as in claim 13, wherein the first server resource notifies the wireless access point of a network address of a second server resource, the wireless access point receiving the third identifier from the second server resource.

15. A method comprising:
  receiving notification of a first identifier and a second identifier, the first identifier assigned to a wireless access point in a network environment, the second identifier assigned to a controller resource in the network environment;
  mapping the second identifier to a third identifier, the third identifier assigned to a wireless network controller;
  transmitting a message to the wireless access point, the message including the third identifier assigned to the wireless network controller the message notifying the wireless access point that the wireless network controller assigned the third identifier has been provisioned to control the wireless access point;
  wherein mapping the second identifier to the third identifier includes: mapping a combination of the first identifier and the second identifier to the third identifier assigned to the wireless network controller; and
  wherein the second identifier is a domain name value assigned to the controller resource.

16. A method comprising:
  receiving notification of a first identifier and a second identifier, the first identifier assigned to a wireless access point in a network environment, the second identifier assigned to a controller resource in the network environment;
  mapping the second identifier to a third identifier, the third identifier assigned to a wireless network controller;
  transmitting a message to the wireless access point, the message including the third identifier assigned to the wireless network controller, the message notifying the wireless access point that the wireless network controller assigned the third identifier has been provisioned to control the wireless access point;
  wherein the mapping of the second identifier to the wireless network controller is based at least in part on a geographical location of the wireless access point; and
  wherein a server resource providing the wireless access point with the first identifier and the second identifier is aware of the geographical location of the wireless access point.

17. A system comprising:
  a first server resource, the first server resource:
    receiving notification of a first identifier and a second identifier, the first identifier assigned to a wireless access point in a network environment, the second identifier assigned to a controller resource in the network environment;
    mapping the second identifier to a third identifier, the third identifier assigned to a wireless network controller in the network environment;
    provisioning the wireless network controller for use by the wireless access point;
    communicating a message to the wireless access point, the message including the third identifier assigned to the wireless network controller;
    wherein the first server resource receives the first identifier and the second identifier in the notification, the notification transmitted from the wireless access point; and
  the system further comprising: a second server resource, the second server resource assigning network addresses to resources in the network environment, the first identifier being a source network address assigned to the wireless access point by the second server resource.

18. The system as in claim 17, wherein the second server resource notifies the wireless access point of a network address assigned to the first server resource from which the wireless access point obtains the third identifier assigned to the wireless network controller.

19. The system as in claim 17, wherein the third identifier is a network address assigned to the wireless network controller; and
    wherein a second server resource communicates the message including the network address of the controller resource from a DNS (Domain Name Server) to the wireless access point.

20. The system as in claim 17, wherein the message indicates identities of multiple network controllers selectable by the wireless access point.

21. The system as in claim 17, wherein the first server resource maps a combination of the first identifier and the second identifier to the third identifier assigned to the wireless network controller.

22. The system as in claim 17, wherein mapping of the second identifier to the third identifier assigned to the wireless network controller is based at least in part on a geographical location of the wireless access point.

23. The system as in claim 17, wherein the second identifier is a domain name assigned to the controller resource.

24. A system comprising:
    a first server resource, the first server resource:
        receiving notification of a first identifier and a second identifier, the first identifier assigned to a wireless access point in a network environment, the second identifier assigned to a controller resource in the network environment;
        mapping the second identifier to a third identifier, the third identifier assigned to a wireless network controller in the network environment;
        provisioning the wireless network controller for use by the wireless access point; and
        communication a message to the wireless access point, the message including the third identifier assigned to the wireless network controller;
    wherein mapping of the second identifier to the third identifier assigned to the wireless network controller is based at least in part on a geographical location of the wireless access point; the system further comprising:
        a second server resource, the second server resource providing the wireless access point with the first identifier and the second identifier, the second server resource aware of the geographical location of the wireless access point.

25. A method comprising:
    receiving notification of a first identifier and a second identifier, the first identifier assigned to a wireless access point in a network environment, the second identifier assigned to a controller resource in the network environment;
    mapping the second identifier to a third identifier, the third identifier assigned to a wireless network controller;
    transmitting a message to the wireless access point, the message including the third identifier assigned to the wireless network controller, the message notifying the wireless access point that the wireless network controller assigned the third identifier has been provisioned to control the wireless access point;
    wherein the second identifier is a domain name value assigned to the controller resource; and
    wherein the domain name value corresponds to a service provider supporting mobile subscribers in a respective geographical area in which the wireless access point resides, the wireless network controller being associated with the service provider.

26. The method as in claim 25, wherein the mapping of the second identifier to the third identifier is based on awareness of the geographical area of the wireless access point.

* * * * *

UNITED STATES PATENT AND TRADEMARK OFFICE
CERTIFICATE OF CORRECTION

PATENT NO. : 10,862,853 B2
APPLICATION NO. : 16/280473
DATED : December 8, 2020
INVENTOR(S) : Qiang Zhang and Arun Manroa It is certified that error appears in the above-identified patent and that said Letters Patent is hereby corrected as shown below:

In the Claims

Claim 24, Column 18, Line 1, delete "communication" and insert --communicating--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*